US009824493B1

United States Patent
Chen et al.

(10) Patent No.: US 9,824,493 B1
(45) Date of Patent: Nov. 21, 2017

(54) SYSTEMS AND METHODS FOR QUADRILATERAL MESH GENERATION

(71) Applicant: SAS IP, Inc., Cheyenne, WY (US)

(72) Inventors: James Chen, McDonald, PA (US); Wa Kwok, Pittsburgh, PA (US); Gunay Orbay, Pittsburgh, PA (US); Bertrand Pellenard, Pittsburgh, PA (US); Shailendra Rawat, Arlington Heights, IL (US); Joseph Tristano, McMurray, PA (US)

(73) Assignee: Ansys, Inc., Canonsburg, PA (US)

( * ) Notice: Subject to any disclaimer, the term of this patent is extended or adjusted under 35 U.S.C. 154(b) by 251 days.

(21) Appl. No.: 14/716,258

(22) Filed: May 19, 2015

Related U.S. Application Data

(60) Provisional application No. 62/000,749, filed on May 20, 2014.

(51) Int. Cl.
  *G06T 1/20* (2006.01)
  *G06T 17/20* (2006.01)
  *G06T 3/40* (2006.01)

(52) U.S. Cl.
  CPC ............ *G06T 17/205* (2013.01); *G06T 3/403* (2013.01); *G06T 2200/04* (2013.01); *G06T 2200/21* (2013.01)

(58) Field of Classification Search
  None
  See application file for complete search history.

(56) References Cited

U.S. PATENT DOCUMENTS

| 7,671,858 B1 * | 3/2010 | Staten ..................... G06T 17/10 345/419 |
| 9,323,869 B1 * | 4/2016 | Kanthasamy ........... G06F 17/50 |

OTHER PUBLICATIONS

Bommes et al, "Quad-Mesh Generation and Processing: A Survey", Computer Graphics Forum, 32(6), 2013.*
Fogg et al, "Multi-Block Decomposition using Cross Fields", VI Intl. Conf. on Adaptive Modeling and Simulation ADMOS 2013, 2013.*
Bunin G., "A continuum theory for unconstrained mesh generation in two dimensions", Computer Aided Geometric Design 25, pp. 14-40, 2008.*
Shimada et al, "Anisotropic triangular meshing of parametric surfaces via close packing of ellipsoidal bubbles", 6th International Meshing Roundtable, 1997.*

(Continued)

*Primary Examiner* — Ulka Chauhan
*Assistant Examiner* — Patrick F Valdez
(74) *Attorney, Agent, or Firm* — Jones Day

(57) ABSTRACT

Systems and methods are provided for quadrilateral mesh generation. The system includes one or more data processors and a non-transitory computer-readable storage medium. The data processors are configured to: receive a geometric structure representing a physical object; determine a directional field; determine a size field; select one or more locations from a region of the geometric structure, the locations being associated with local data; and generate one or more quadrilateral mesh elements based at least in part on the directional field, the size field, and the local data. The non-transitory computer-readable storage medium is configured to store data related to the structure, data related to the directional field, data related to the size field, and the local data.

18 Claims, 11 Drawing Sheets

(56) References Cited

OTHER PUBLICATIONS

Alliez et al, "Anisotropic polygonal remeshing", ACM Trans. on Graphics (TOG), 22(3), 2003.*
Blacker et al, "Paving: A New Approach to Automated Quadrilateral Mesh Generation", Intl. Journal for Numerical Methods in Engineering, vol. 32, pp. 811-847, 1991.*
Owen et al, "Q-Morph: An Indirect Approach to Advancing Front Quad Meshing", Intl. Journal for Numerical Methods in Engineering, vol. 44, pp. 1317-1340, 1999.*
Zhou et al, "An Angle-Based Approach to Two-Dimensional Mesh Smoothing", IMR, Oct. 2000.*
Ray et al, "Geometry-Aware Direction Field Processing", ACM Trans. on Graphics 29(1), Article 1, Dec. 2009.*
Myles et al, "Feature-aligned T-meshes", ACM Trans. on Graphics (TOG), 29(4), 2010.*
Wang et al, "Quality mesh smoothing via local surface fitting and optimum projection", Graphical Models, vol. 73, pp. 127-139, 2011.*
Knoppel et al, "Globally optimal direction fields", ACM Trans. on Graphics (TOG), 32(4), 2013.*

\* cited by examiner

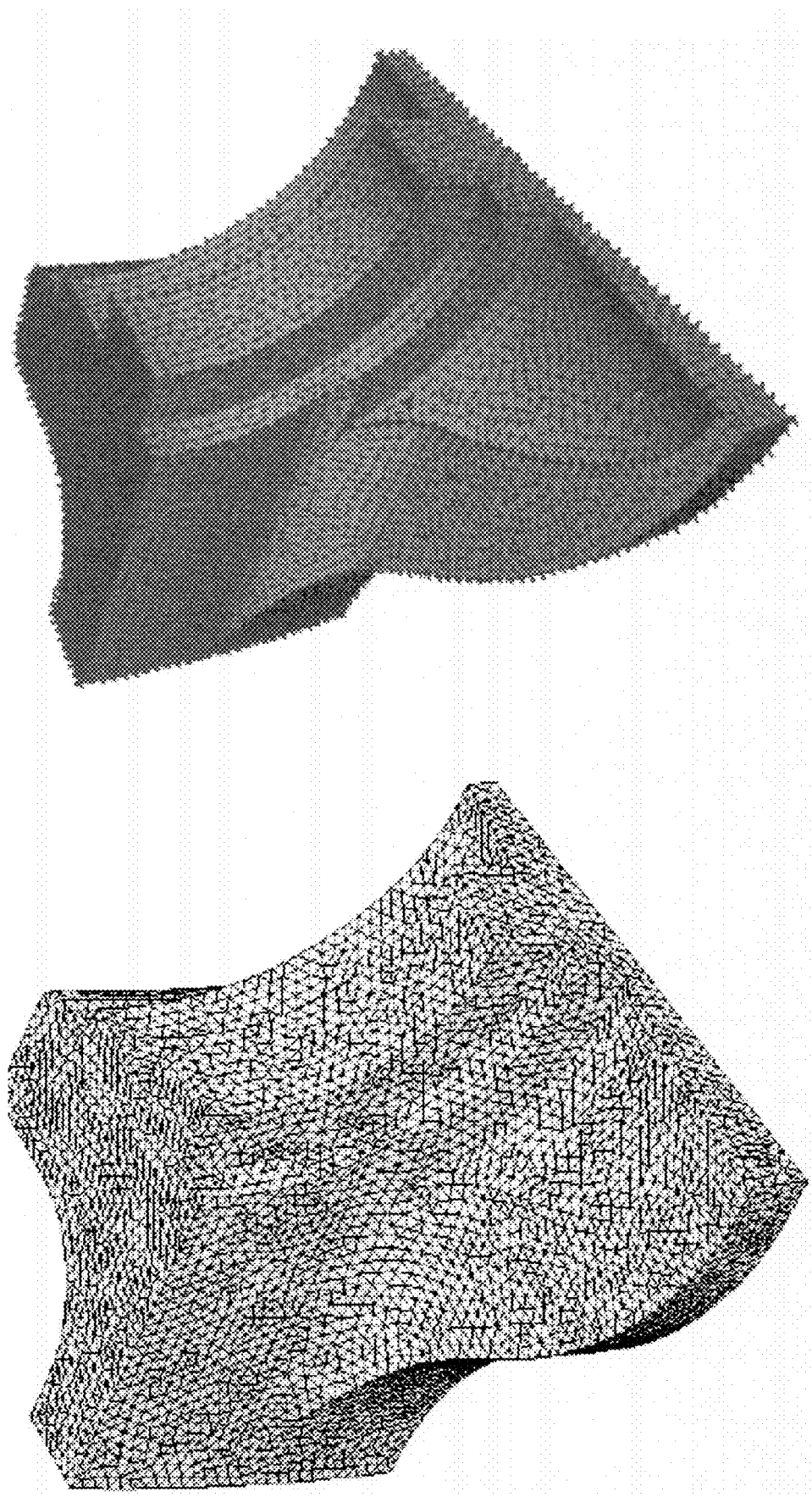

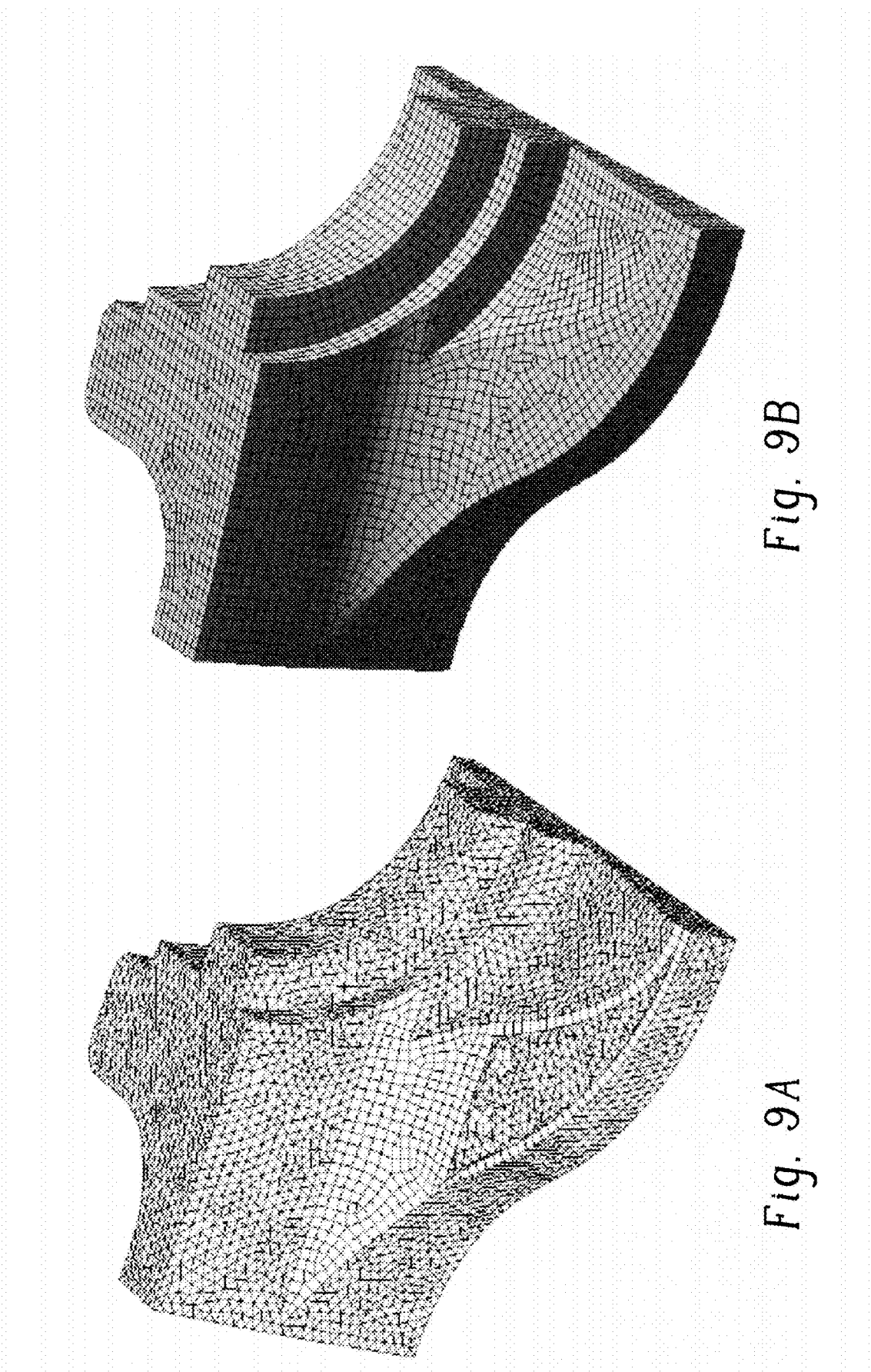

SYSTEMS AND METHODS FOR QUADRILATERAL MESH GENERATION

CROSS-REFERENCE TO RELATED APPLICATIONS

This disclosure claims priority to and benefit from U.S. Provisional Patent Application No. 62/000,749, filed on May 20, 2014, the entirety of which is incorporated herein by reference.

TECHNICAL FIELD

The present disclosure relates generally to the field of computational simulations, and, more specifically, to processor-implemented systems and methods for finite element analysis.

BACKGROUND

Finite element analysis is a fundamental numerical analysis technique. The goal of finite element analysis is to solve a set of partial differential equations over a geometrical domain. A mesh corresponds to a discretization of the geometrical domain and includes a collection of mesh entities. The mesh entities often have simple shapes. For example, zero-dimensional mesh entities include vertices, one-dimensional mesh entities include lines, two-dimensional mesh entities include triangles or quandrangles, and three-dimensional mesh entities include tetrahedra, hexahedra or prisms.

Quadrilateral meshing often breaks a domain into a structured set of quadrilaterals, where interior nodes have four adjacent elements. Quadrilateral meshing has evolved in two major areas: local quadrilateral meshing and global quadrilateral meshing. FIG. 1(A) and FIG. 1(B) depict example diagrams showing local quadrilateral meshing and global quadrilateral meshing respectively. As shown in FIG. 1(A), local quadrilateral meshing uses a paving approach or a Q-Morph approach. For example, according to the paving approach (e.g., Ted D. Blacker, and Michael B. Stephenson, "Paving: A new approach to automated quadrilateral mesh generation," International Journal for Numerical Methods in Engineering 32.4 (1991): 811-847), a row of quadrilateral elements is generated along an existing boundary, and another row of quadrilateral elements is generated inside of the boundary. The Q-Morph approach (e.g., Steven J. Owen, et al., "Q-Morph: an indirect approach to advancing front quad meshing," International Journal for Numerical Methods in Engineering 44.9 (1999): 1317-1340) starts with a background mesh obtained by triangulation of a surface. An initial front is defined from one or more edges in the background mesh. An edge in the background mesh adjacent to only one triangle becomes part of the initial front. Each edge on the front is initially sorted according to a state of the edge which defines how the edge is to be used in forming a quadrilateral element. Angles between adjacent front edges determine the state of an individual front. For example, a minimum deviation energy is used for determining two new front edges.

Each front edge is individually processed to create a new quadrilateral element from the triangles in the background mesh. Particularly, a front edge is used as the initial base edge of a quadrilateral element, and one or more side edges are defined, e.g., by swapping the diagonal of adjacent triangles, or by splitting triangles to create a new edge. A top edge is generated between two nodes at the ends of two side edges by modifying the local triangulation using local edge swaps. The quadrilateral element is formed by merging any triangles bounded by the front edge, the side edges and the top edge and smoothed locally. The edges on the front that have two quadrilateral adjacencies are removed from the front, and edges that have one triangle and one quadrilateral adjacency are added to the front. Front edge processing continues until all edges on the front have been depleted.

As shown in FIG. 1(B), global quadrilateral meshing involves generation of a directional field that satisfies a set of directional constraints. Then, a globally smooth parameterization may be computed based on the directional field for mesh generation (e.g., David Bommes, Henrik Zimmer, and Leif Kobbelt, "Mixed-integer quadrangulation," ACM Transactions on Graphics (TOG). Vol. 28. No. 3. ACM, 2009).

SUMMARY

As disclosed herein, processor-implemented systems and methods are provided for quadrilateral mesh generation. The system includes one or more data processors and a non-transitory computer-readable storage medium. The data processors are configured to: receive a geometric structure representing a physical object; determine a directional field; determine a size field; select one or more locations from a first region of the geometric structure, the locations being associated with local data; and generate one or more quadrilateral mesh elements based at least in part on the directional field, the size field, and the local data. The non-transitory computer-readable storage medium is configured to store data related to the structure, data related to the directional field, data related to the size field, and the local data.

As an example, a processor-implemented system is provided for determining a directional field for a geometric structure representing a physical object. The system includes one or more data processors and a non-transitory computer-readable storage medium. The data processors are configured to: receive a geometric structure representing a physical object; generate one or more initial meshes for the geometric structure; determine one or more first constraints related to one or more curvature directions; determine one or more second constraints related to local data of the geometric structure; and determine the directional field based at least in part on the first constraints and the second constraints. The non-transitory computer-readable storage medium is configured to store data related to the geometric structure, data related to the initial meshes, data related to the first constraints, data related to the second constraints, and data related to the directional field.

As another example, a processor-implemented system is provided for generating quadrilateral mesh elements for a geometric structure representing a physical object. The system includes one or more data processors and a non-transitory computer-readable storage medium. The data processors are configured to: receive a geometric structure representing a physical object; generate one or more initial meshes; determine one or more first constraints related to one or more curvature directions; determine one or more second constraints related to local data of the geometric structure; determine the directional field based at least in part on the first constraints and the second constraints; determine a size field; select one or more locations from a first region of the geometric structure, the locations being associated with local data; and generate one or more quadrilateral mesh elements based at least in part on the directional field, the size field, and the local data. The non-transitory computer-readable storage medium is configured to store data related to the geometric structure, data related to the initial meshes, data related to the first constraints, data related to the second constraints, data related to the structure, data related to the directional field, data related to the size field, and the local data.

As yet another example, a processor-implemented system is provided for determining a directional field for a geometric structure representing a physical object. The data processors are configured to: receive a geometric structure representing a physical object; generate a mesh for the geometric structure; determine one or more first constraints related to one or more curvature directions, wherein the first constraints are removed in response to the curvature directions being discontinuous; determine one or more second constraints related to local data of the geometric structure; and determine the directional field based at least in part on the first constraints and the second constraints. The non-transitory computer-readable storage medium is configured to store data related to the geometric structure, data related to the initial meshes, data related to the first constraints, data related to the second constraints, and data related to the directional field.

According to one embodiment, a method for generating quadrilateral mesh elements to represent a physical object includes: receiving a geometric structure representing a physical object, a first data structure for the geometric structure being stored in a non-transitory computer-readable storage medium; determining a directional field using one or more data processors, data related to the directional field being stored in the non-transitory computer-readable storage medium; determining a size field using the one or more data processors, data related to the size field being stored being stored in the non-transitory computer-readable storage medium; selecting one or more locations from a region of the geometric structure, local data associated with the locations being stored in the non-transitory computer-readable storage medium; and generating one or more quadrilateral mesh elements based at least in part on the directional field, the size field, and the local data using the one or more data processors, a second data structure for the one or more quadrilateral elements being stored in the non-transitory computer-readable storage medium. The second data structure is updated based at least in part on the first data structure, the data related to the directional field, the data related to the size field and the local data.

According to another embodiment, a method for determining a directional field for a geometric structure representing a physical object includes: receiving a geometric structure representing a physical object, a first data structure for the geometric structure being stored in a non-transitory computer-readable storage medium; generating one or more initial meshes for the geometric structure using the one or more data processors, a second data structure for the one or more initial meshes being stored in the non-transitory computer-readable storage medium; determining one or more first constraints related to one or more curvature directions of the geometric structure based at least in part on the one or more initial meshes using the one or more data processors, data related to the one or more first constraints being stored in the non-transitory computer-readable storage medium; determining one or more second constraints related to local data of the geometric structure using the one or more data processors, data related to the one or more second constraints being stored in the non-transitory computer-readable storage medium; and determining a directional field based at least in part on the one or more first constraints and the one or more second constraints using the one or more data processors, data related to the directional field being stored in the non-transitory computer-readable storage medium. The data related to the directional field is updated based at least in part on the data related to the one or more first constraints and the data related to the one or more second constraints.

According to yet another embodiment, a machine-readable medium encoded with instructions for commanding one or more data processors to execute operations of a method for generating quadrilateral mesh elements to represent a physical object. The method includes: receiving a geometric structure representing a physical object, a first data structure for the geometric structure being stored in a non-transitory computer-readable storage medium; determining a directional field using one or more data processors, data related to the directional field being stored in the non-transitory computer-readable storage medium; determining a size field using the one or more data processors, data related to the size field being stored being stored in the non-transitory computer-readable storage medium; selecting one or more locations from a region of the geometric structure, local data associated with the locations being stored in the non-transitory computer-readable storage medium; and generating one or more quadrilateral mesh elements based at least in part on the directional field, the size field, and the local data using the one or more data processors, a second data structure for the one or more quadrilateral elements being stored in the non-transitory computer-readable storage medium. The second data structure is updated based at least in part on the first data structure, the data related to the directional field, the data related to the size field and the local data.

According to yet another embodiment, a machine-readable medium encoded with instructions for commanding one or more data processors to execute operations of a method for determining a directional field for a geometric structure representing a physical object. The method includes: receiving a geometric structure representing a physical object, a first data structure for the geometric structure being stored in a non-transitory computer-readable storage medium; generating one or more initial meshes for the geometric structure using the one or more data processors, a second data structure for the one or more initial meshes being stored in the non-transitory computer-readable storage medium; determining one or more first constraints related to one or more curvature directions of the geometric structure based at least in part on the one or more initial meshes using the one or more data processors, data related to the one or more first constraints being stored in the non-transitory computer-readable storage medium; determining one or more second constraints related to local data of the geometric structure using the one or more data processors, data related to the one or more second constraints being stored in the non-transitory computer-readable storage medium; and determining a directional field based at least in part on the one or more first constraints and the one or more second constraints using the one or more data processors, data related to the directional field being stored in the non-transitory computer-readable storage medium. The data related to the directional field is updated based at least in part on the data related to the one or more first constraints and the data related to the one or more second constraints.

BRIEF DESCRIPTION OF THE DRAWINGS

FIG. 7(A)-FIG. 9(B) depict example diagrams showing a process for quadrilateral mesh generation.

DETAILED DESCRIPTION

Figure 1A:
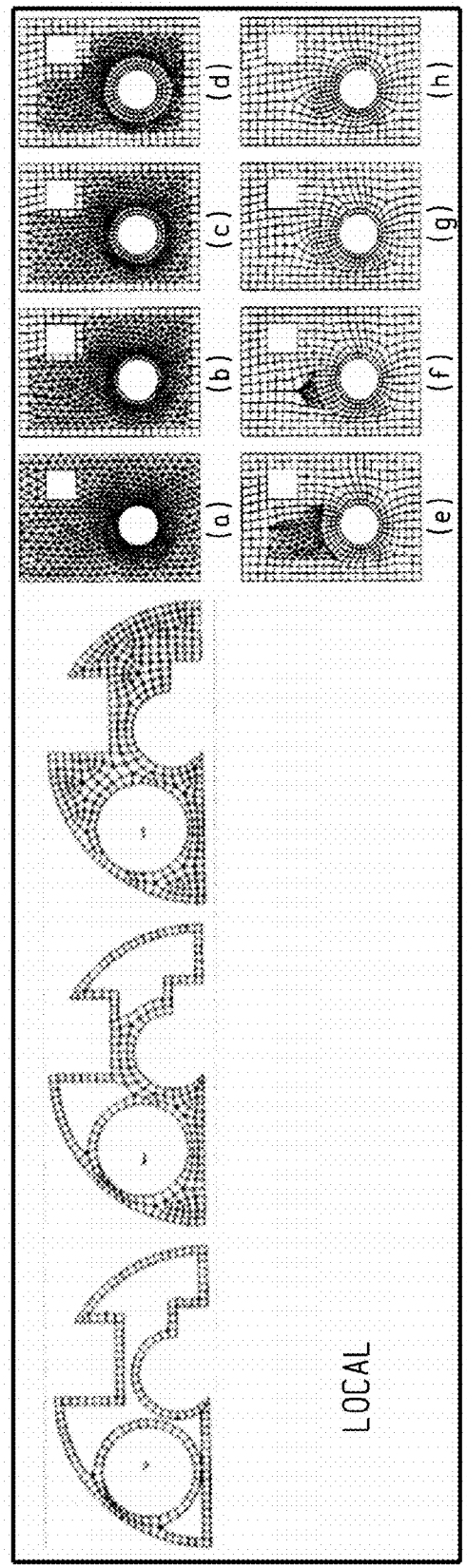
FIG. 1(A) and FIG. 1(B) depict example diagrams showing local quadrilateral meshing and global quadrilateral meshing respectively.
Figure 1B:
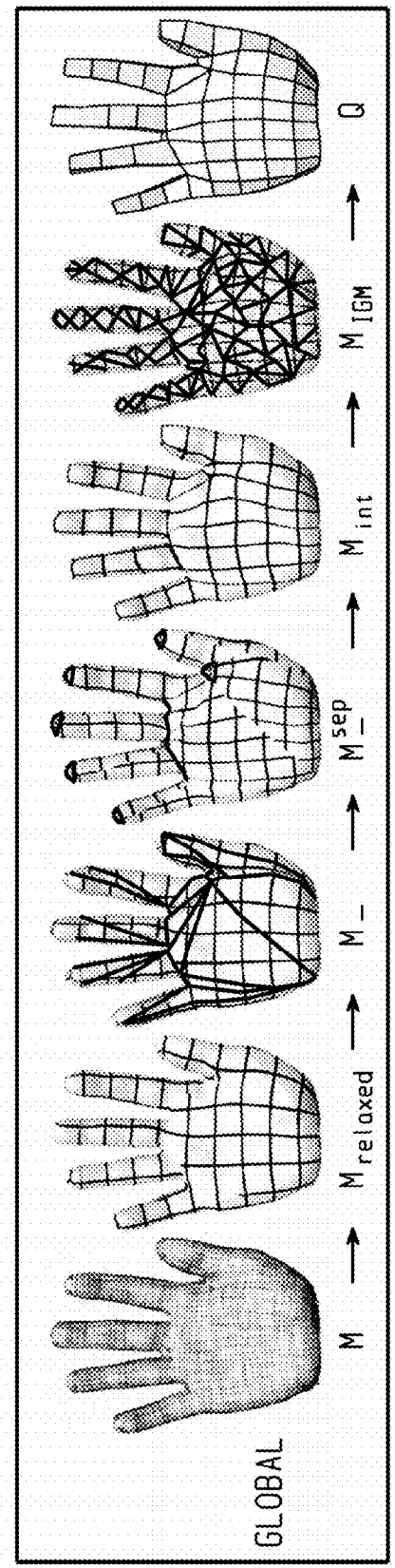
Figure 2:
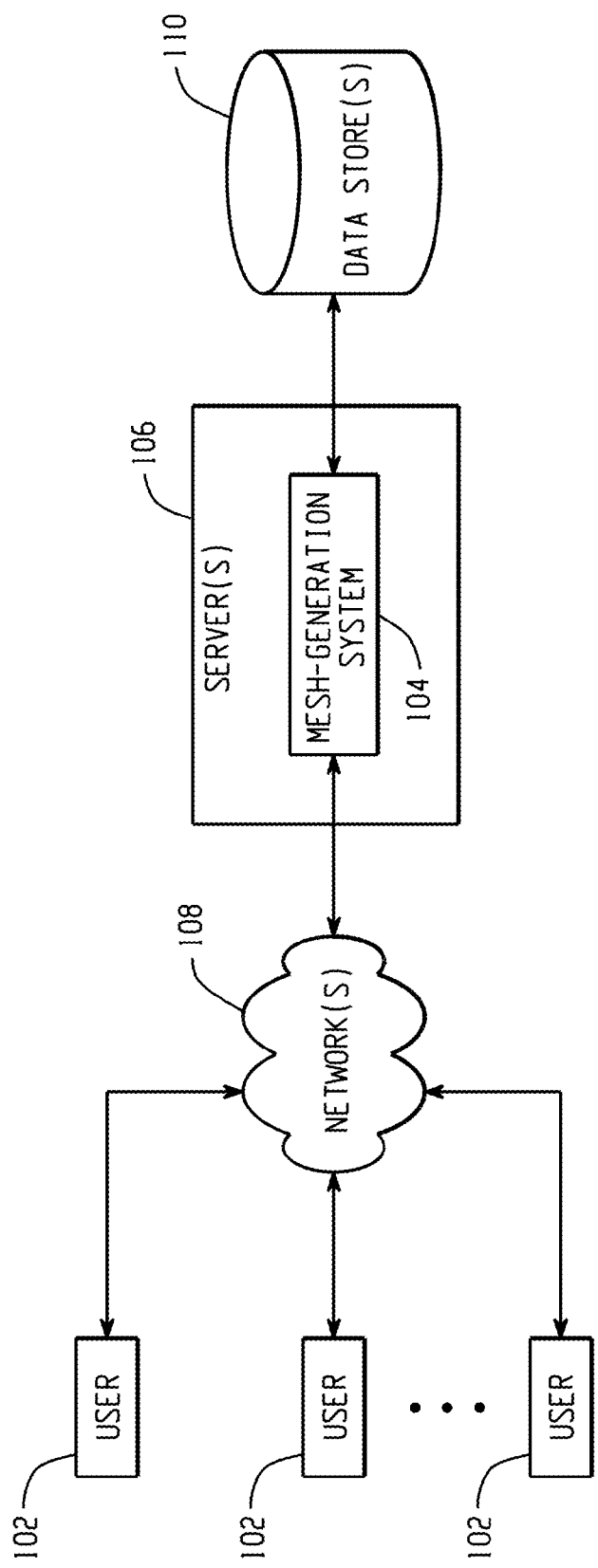
FIG. 2 depicts an example computer-implemented environment wherein users can interact with a mesh-generation system hosted on one or more servers through a network.

FIG. 2 depicts an example computer-implemented environment wherein users 102 can interact with a mesh-generation system 104 hosted on one or more servers 106 through a network 108. The mesh-generation system 104 can assist the users 102 to generate quadrilateral (quad) meshes that include quadrilateral elements (e.g., polygons with four sides) to represent a physical object. For example, the generated quadrilateral meshes may be used for rendering physical objects in movies and video games, in addition to use in numerical simulations.

As shown in FIG. 2, the users 102 can interact with the mesh-generation system 104 through a number of ways, such as over one or more networks 108. One or more servers 106 accessible through the network(s) 108 can host the mesh-generation system 104. The one or more servers 106 can also contain or have access to one or more data stores 110 for storing data for the mesh-generation system 104. The mesh-generation system 104 generates quadrilateral meshes through a combination of features from local quadrilateral meshing and global quadrilateral meshing.

According to some embodiments, the mesh-generation system 104 performs local quadrilateral meshing and global quadrilateral meshing. For example, the mesh-generation system 104 extends the local quadrilateral meshing approach to generate (e.g., sequentially) quadrilateral mesh elements using existing edges or boundaries using any advancing front meshing method. In addition, the mesh-generation system 104 extends the global quadrilateral meshing approach to generate a directional field (e.g., a cross field) that satisfies a set of directional constraints and compute a globally smooth parameterization based on the directional field for mesh generation.

According to certain embodiments, the mesh-generation system 104 performs local quadrilateral meshing through a paving approach, a Q-Morph approach, or any other suitable approaches. For example, the mesh-generation system 104 adjusts certain quadrilateral elements to improve mesh quality and boundary smoothness. Interior angles in the paving boundary are seamed or closed by connecting opposing elements. In addition, the next row is adjusted to correct for elements that become too small or too large, and the paving boundary is checked for intersections with itself or with other paving boundaries. Furthermore, the completed mesh is adjusted (e.g., element deletion and/or addition) to improve the mesh quality.

In some embodiments, the mesh-generation system 104 extends the Q-Morph approach to utilize an existing triangle mesh only to eliminate 3D intersection checks that result from the paving algorithm. For example, the mesh-generation system 104 places a new point in the existing triangle mesh and recover, through a series of splits and swaps, an edge for building the quadrilateral mesh. A topological clean-up and a smoothing process are performed to improve mesh element quality.

According to certain embodiments, the mesh-generation system 104 performs global quadrilateral meshing by constructing a directional field (e.g., a cross field) that satisfies a sparse set of directional constraints, e.g., to capture a geometric structure of a surface. For example, the directional constraints are detected using anisotropy measures or determined by manually selection. The directional field of degree n (n is an integer) associates a collection of n evenly spaced unit tangent vectors to each point of a surface in the mesh. For instance, n=1, 2 and 4 correspond to a direction field, a line field, and a cross field, respectively. The directional field may include singularities, i.e., isolated points where the directional field does not vary smoothly. A globally smooth parametrization is computed so that iso-parameter lines follow the directional field (e.g., with n=4). Any known methods (e.g., David Bommes, Henrik Zimmer, and Leif Kobbelt, "Mixed-integer quadrangulation," ACM Transactions on Graphics (TOG). Vol. 28. No. 3. ACM, 2009) can be implemented for performing the globally smooth parametrization. The triangle mesh is cut open to create a surface patch with a disk-like topology where directional field singularities lie at the boundary. Subsequently, one or more piecewise linear scalar fields are created, and the gradients of the scalar fields follow the directional field. Quadrilateral mesh elements are then generated.

Figure 3C:
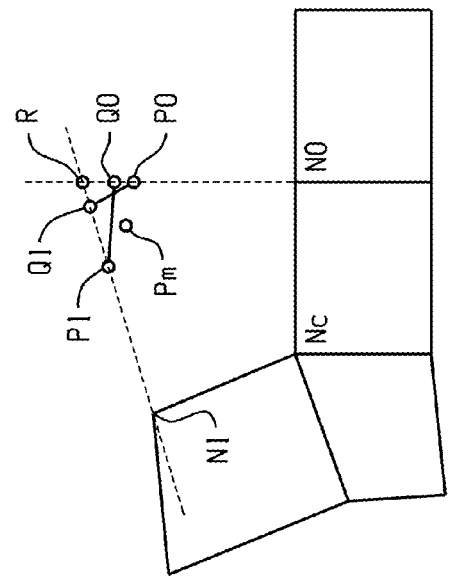
FIG. 3(C) depicts an example diagram showing mesh generation based on a combination of a directional field and a size field.
Figure 3B:
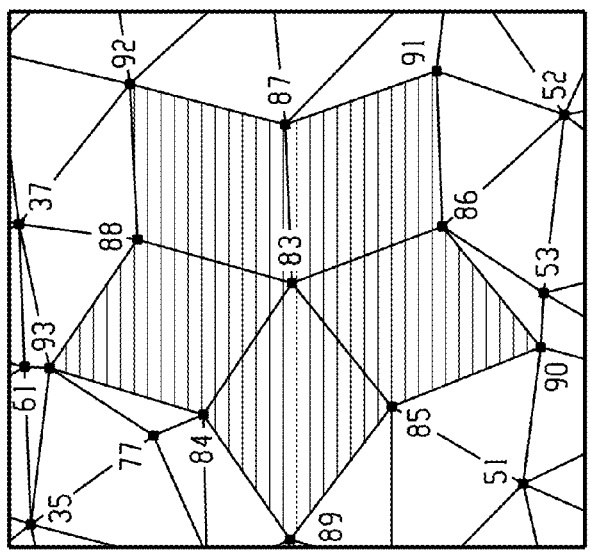
FIG. 3(A)-FIG. 3(B) depict example diagrams showing mesh templates for singularities related to a directional field.
Figure 3A:
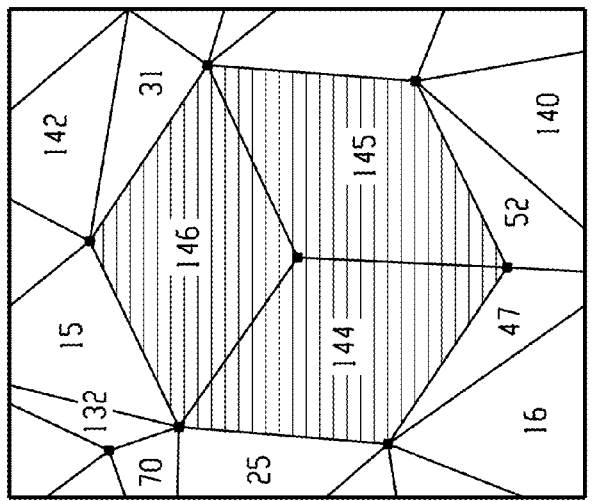

FIG. 3(A)-FIG. 3(C) depict example diagrams for generating quadrilateral meshes using a directional field (e.g., a crossfield). The mesh-generation system 104 extends the local quadrilateral meshing (e.g., advancing front quadrilateral meshing) using a combination of a directional field and a size field to generate high quality and feature-aligned quad meshes. FIG. 3(A) and FIG. 3(B) show injection of quadrilateral mesh elements for singularities. FIG. 3(C) shows mesh generation based on a globally smooth directional field that exhibits 4-directional symmetry (e.g., 4-Rotational Symmetry (4-RoSy) field).

Specifically, as shown in FIG. 3(C), for non-singularities, the mesh-generation system 104 uses a weighted combination of the directional field and the size field to generate quadrilateral mesh elements. The directional field and the size field can be user defined or computed. For example, a crossfield is computed based on the principal curvature directions of an input discretization after constraining the surface boundaries for edge alignment. In some embodiments, the locations of the singularities are computed to capture better alignment with the principal curvature directions and constraints.

As shown in FIG. 3(A) and FIG. 3(B), for singularities, the mesh-generation system 104 provides predetermined directions and predetermined sizes for generating quadrilateral mesh elements. The mesh-generation system 104 meshes singularities with a template by placing a fixed pattern of quadrilateral mesh elements around the singularities. Specifically, as shown in FIG. 3(A), the singularity exhibits a discrete rotational symmetry of 120°, and the mesh template for the singularity includes three quadrilateral mesh elements. As shown in FIG. 3(B), the singularity exhibits a discrete rotational symmetry of 72°, and the mesh template for the singularity includes five quadrilateral mesh elements. In some embodiments, initial fronts are injected at singularities and allowed to grow based on a nearby field. In some embodiments, an initial front direction around a singularity is chosen to minimize an energy related to the cross field. In certain embodiments, a front chain (i.e., a collection of front edges) is inserted and the front edge processing begins from a singularity until the front chain hits a boundary or another singularity. In some embodiments, a front chain (i.e., a collection of front edges) is inserted for a number of layers and the front edge processing stops thereafter. Singularities may be added a-posteriori by locally removing existing quadrilateral elements and injecting the singularities for growth to the extent of a sculpted subdomain.

The mesh-generation system 104 combines global information (e.g., the directional field and the size field) and local information (e.g., sizes of local fronts, interaction between local fronts, interactions between features, and front directions) for mesh generation. Various weights, such as a front angle weight and a length weight, may be applied for the combination of the global information and the local information. The front angle weight corresponds to an angle between the directional field (e.g., a cross field) and a front growth direction. The length weight corresponds to a ratio between the size field and a front length. For example, the mesh-generation system 104 can apply a linear combination of the front angle weight and the length weight, depending on which of the two factors (e.g., the crossfield and the size field) needs to be dominant. In another example, the mesh-generation system 104 can adopt an adaptive approach for applying the combination of the front angle weight and the length weight.

In some embodiments, for surface meshing, the mesh-generation system 104 selects a direction most perpendicular to a current front for generating mesh elements. In certain embodiments, the mesh-generation system 104 computes a cross field, and selects one of two orthogonal directions provided by a cross field that aligns better with the front growth direction to create new fronts. If the difference between the cross field and the initial front growth direction exceeds a threshold (e.g., 30°-35°), the mesh-generation system 104 selects a direction of the cross field that aligns well with one or more neighboring fronts. If there is no neighboring front, the mesh-generation system 104 chooses either of the two orthogonal directions of the cross field to advance the initial front. In some embodiments, a front smoothing process may be performed (e.g., to move one or more vertices around) to improve the shapes of the generated quadrilateral mesh elements based on a weighted combination of a size field and a directional field (e.g., a cross field) at a front location.

Figure 4:
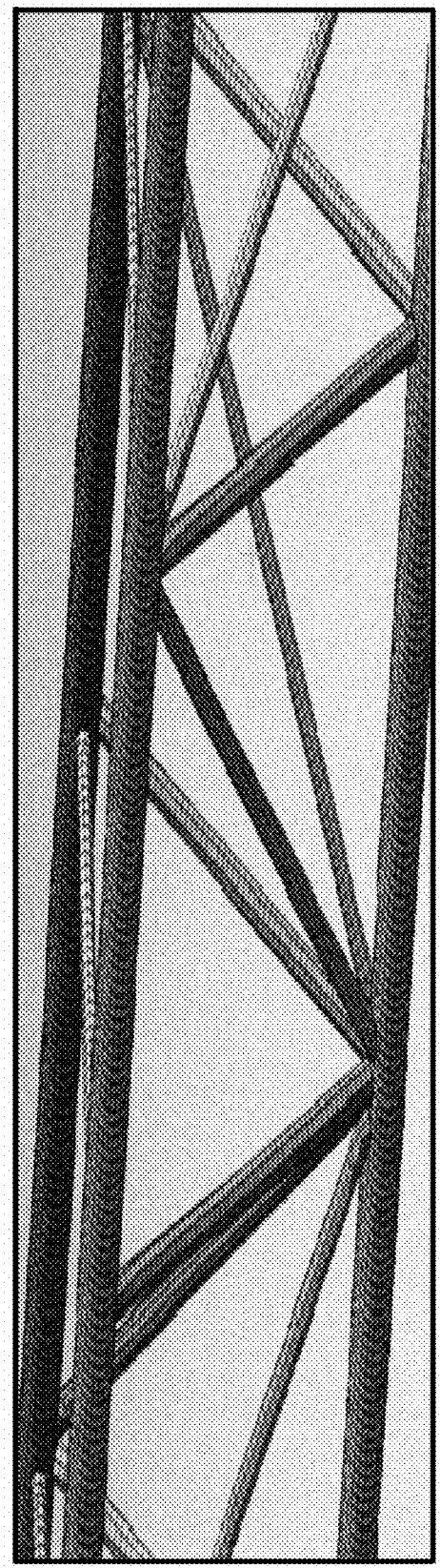
FIG. 4 depicts an example diagram showing quadrilateral meshes generated for tube-shaped regions in a truss structure.

In certain embodiments, the mesh-generation system 104 generates quadrilateral meshes element by element. In some embodiments, the mesh-generation system 104 generates quadrilateral meshes row by row, e.g., for slender tube surfaces. The mesh-generation system 104 proceeds from one end and meshes all the way towards the other end to yield well aligned quadrilateral meshes, as shown in FIG. 4. Tube-shaped regions in a truss structure are separately meshed to produce the quadrilateral mesh elements that follow the axial direction of the tube-shaped regions.

The mesh-generation system 104 can construct smooth directional fields (e.g., line fields, cross fields, etc.) that reduces a smoothness energy over configurations of singularities (e.g., number, location, and index) and aligns with a given guidance field (e.g., principal curvatures). A smoothest directional field (e.g., an optimized directional field) is determined using a sparse eigenvalue problem involving a matrix similar to the co tan-Laplacian matrix. With a guidance field, the optimal directional field is determined by solving a single linear system. Specifically, the mesh-generation system 104 stores $n^{th}$ power of a complex number at each vertex of an initial mesh (e.g., a triangle mesh), together with an arbitrary (e.g., fixed) tangent basis direction. Then, the mesh-generation system 104 measures smoothness of a directional field using ground state energy of an appropriate Schrödinger operator. The mesh-generation system 104 may use a continuum of smoothness energies that provide a tradeoff between the straightness of field lines and the total number of singularities. The mesh-generation system 104 allows a tradeoff between smoothness and alignment with a guidance field (e.g., principal curvatures).

In some embodiments, the mesh-generation system 104 extends a linear system (e.g., Felix Knöppel, et al., "Globally optimal direction fields," ACM Transactions on Graphics (TOG) 32.4 (2013): 59) with complex values for determining a globally smooth directional field (e.g., a crossfield) aligned with principal curvature directions, boundaries and/or user-specified directions. A n-vector field on a surface is represented as follows:

$$\psi = uX \quad (1)$$

where X represents one or more basis vectors and u represents a unit vector. A directional field corresponds to a unit n-vector field. A Dirichlet energy of a n-vector field is defined as follows:

$$E_D(\psi) := \frac{1}{2}\int_M |\nabla \psi|^2 dA \quad (2)$$

where $\nabla$ represents a covariant derivative, i.e., the Levi-Civita connection on a surface M.

The covariant derivative is orthogonally split, e.g., into a sum of Cauchy-Riemann derivatives. The Dirichlet energy decomposes into a holomorphic term ($E_H$) and an anti-holomorphic term ($E_A$) as below:

$$E_D(\psi) = E_H(\psi) + E_A(\psi) := \frac{1}{2}\int_M |\bar{\partial}\psi|^2 dA + \frac{1}{2}\int_M |\partial\psi|^2 dA \quad (3)$$

A smoothness energy is defined as follows:

$$E_s := (1+s)E_H + (1-s)E_A = E_D - s(E_A - E_H) \quad (4)$$

where s represents a parameter. The smoothness energy provides a continuum from anti-holomorphic energy (s=−1) to Dirichlet energy (s=0) to holomorphic energy (s=1). The parameter s controls the deviation of $E_s$ from the standard Dirichlet energy by the difference $$E_A(\psi) - E_H(\psi) = \frac{1}{2}\int_M nK|\psi|^2 dA - \frac{1}{2}\int_{\partial M} \text{Im}\langle\nabla\psi, \psi\rangle \quad (5)$$

where K denotes a Gaussian curvature.

A first global minimizer of the smoothness energy $E_s$ is determined by solving the problem:

$$A\psi = \lambda\psi \quad (6)$$

where $\lambda$ represents a smallest eigenvalue, and A corresponds to a positive quadratic form determined based on $$E_s(\psi) = \frac{1}{2}\langle\langle A\psi, \psi\rangle\rangle.$$

Smoothness and alignment with a guidance field $\phi$ are to be balanced. Alignment with the field $\phi$ is accomplished via a functional $$E_l(\psi) = \int_M \text{Re}(\langle\phi, \psi\rangle) dA = \text{Re}(\langle\langle\phi, \psi\rangle\rangle) \quad (7)$$

where $\phi$ is normalized so that $\|\phi\|=1$. Then, $$E_{s,t} := (1-t)E_s(\psi) - tE_l(\psi) \quad (8)$$

where $t\in[0,1]$ controls the strength of alignment.

Then, the smoothness energy $E_{s,t}$ is minimized over all fields $\Psi$ with $\|\Psi\|=1$. The pointwise magnitude $|\phi|$ determines the local weighting between alignment and smoothness terms. A second global minimizer of the smoothness energy $E_{s,t}$ is determined by solving the problem:

$$(A-\lambda_t I)\tilde{\psi} = \phi \quad (9)$$

where A represents a quadratic form corresponding to $E_{s,t}$. The result is normalized. $\lambda_1$ corresponds to the smallest eigenvalue of A, and the parameter $\lambda_t\in[-\infty, \lambda_1]$ controls the tradeoff between alignment ($\lambda_t \to -\infty$ for $t\to 1$) and smoothness ($(\lambda_t \to \lambda_1$ for $t\to 0$).

The continuous problem of Equation 9 is turned into a matrix problem $$(A-\lambda_t M)\tilde{u} = Mq \quad (10)$$

where q represents a coefficient vector for a piecewise linear version of the guidance field $\phi$. The unit vector u that minimizes the discretized version of the smoothness energy $E_{s,t}$ is given by $$u = \frac{\tilde{u}}{\|\tilde{u}\|}$$

for $$t = \frac{1}{(1+\|\tilde{u}\|)}.$$

For example, $\lambda_t=0$ is used as a starting value to solve the problem, based on Cholesky factorization followed by back substitution. However, the control parameter $\lambda_t$ may not allow direct control on how well the resulting directional field (e.g., a crossfield) aligns with boundaries or user-specified regions.

The mesh-generation system 104 introduces constraints to the linear system related to Equation 10 and generates an overconstrained linear system. A linear least squares method is implemented to solve Au=b, with A=($A_F$ Ac) (a square matrix), $$u = \begin{pmatrix} u_F \\ u_C \end{pmatrix},$$

b=Mq and $$b = \begin{pmatrix} b_F \\ b_C \end{pmatrix}.$$

To balance global alignment (e.g., with principal curvature directions) and local alignment (e.g., with boundaries and/or user-specified directions), a parameter a is introduced into the system represented by Equation 10.

$Au=\alpha Mq$ is to be solved with A=($A_F$ $A_C$) (a square matrix), $$u = \begin{pmatrix} u_F \\ u_C \end{pmatrix}.$$

$A_F$ represents a rectangular matrix of size ($N_F+N_C$, $N_F$), and $A_C$ represents a rectangular matrix of size ($N_F+N_C$, $N_C$), where $N_C$ represents a number of constraints and $N_F$ represents a number of unknowns. Thus, $A_F u_F = \alpha Mq - A_C u_C$.

Let b=$\alpha Mq - A_C u_C$. Then, $A_F^t A_F u_F = A_F^t b$, where $A_F^t$ represents a complex transpose matrix (or hermitian) of $A_F$. Then, $Bu_F=b'$ is to be solved, with $B=A_F^t A_F$ (a square matrix) and $b'=A_F^t b'$.

In some embodiments, the constrained degrees of freedom take pre-specified values and the system is calculated using a least-squares approach. The computed directional field is aligned with principal curvature directions of an input geometric structure. In addition, the computed directional field is also assigned with boundaries (e.g., holes, cutouts, outer edges of a surface, etc.), sharp features (e.g., crease edges, etc.), prominent features (e.g., features with high curvatures, smooth creases, etc.), and/or user-specified directions.

The extension of the linear system, as described above, is merely an example, which should not unduly limit the scope of the invention. Any cross-field design methods (e.g., iterative and/or matrix solutions) may be implemented. In some embodiments, constraints can be added in an n-angle space. For example, directional constraints can be applied to any algorithms that calculate a directional field (e.g., a crossfield) as a system of linear equations.

Figure 5:
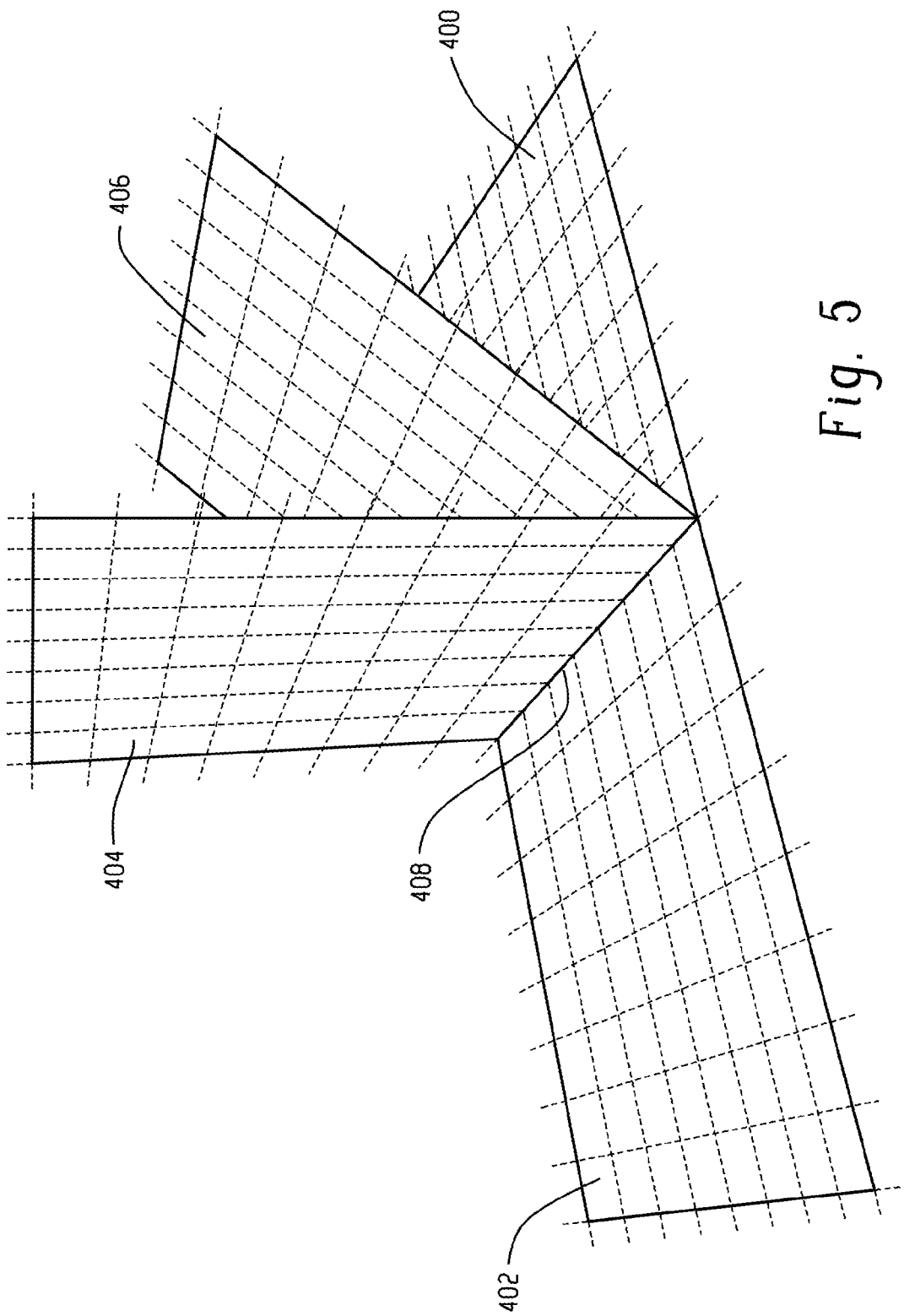
FIG. 5 depicts an example diagram showing a model being decomposed into multiple faces for meshing.

FIG. 5 depicts an example diagram showing a model being decomposed into multiple faces for meshing. As shown in FIG. 5, the model is decomposed into multiple regions, e.g., the regions 400, 402, 404, and 406. The mesh-generation system 104 performs local quadrilateral meshing (e.g., using advancing front approaches such as paving and Q-Morph) with global control. Specifically, quadrilateral mesh elements are generated at one or more boundaries, and as one or more fronts advances towards inside of the boundaries, one or more directional fields (e.g., cross fields) are computed to guide the fronts to yield well aligned meshes. A directional field (e.g., a cross field) is determined on one or more vertices for each region of the model. As shown in FIG. 5, compatible meshes are produced at non-manifold connections. For example, at a common edge 408, the regions 400, 402, 404 and 406 share a same computed directional field as well as a same front configuration (e.g., the number and locations of vertices along the edge 408).

Figure 6:
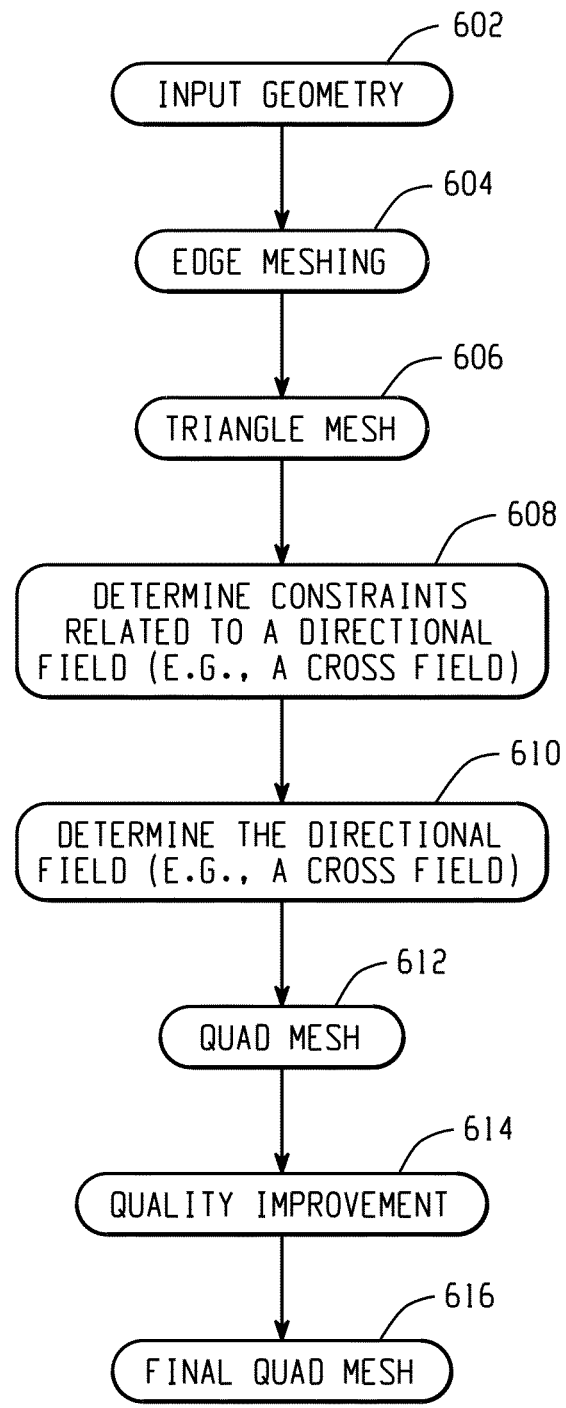
FIG. 6 depicts an example flow chart for quadrilateral mesh generation.
Figure 7B:
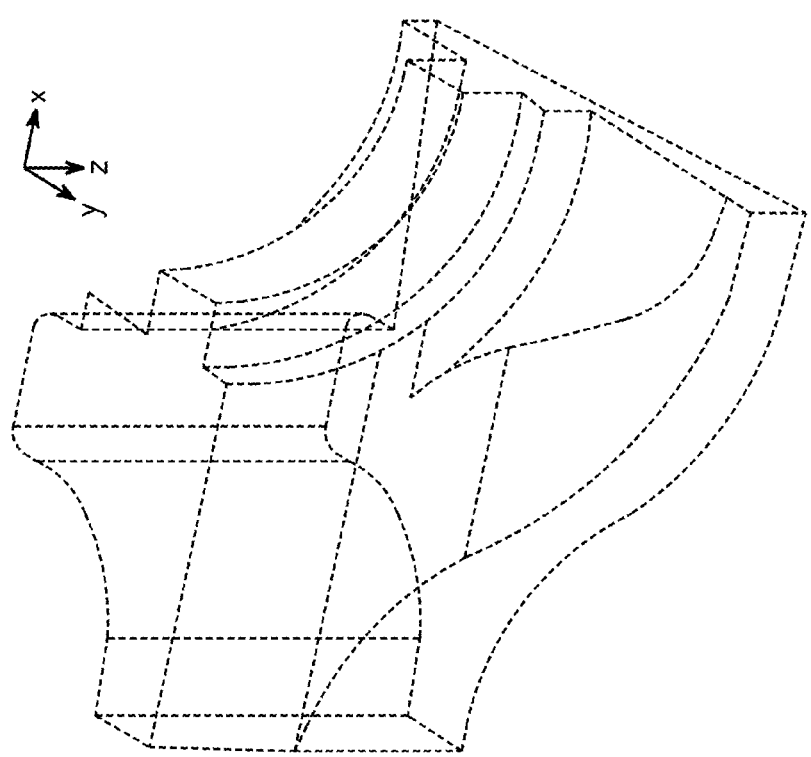
Figure 7A:
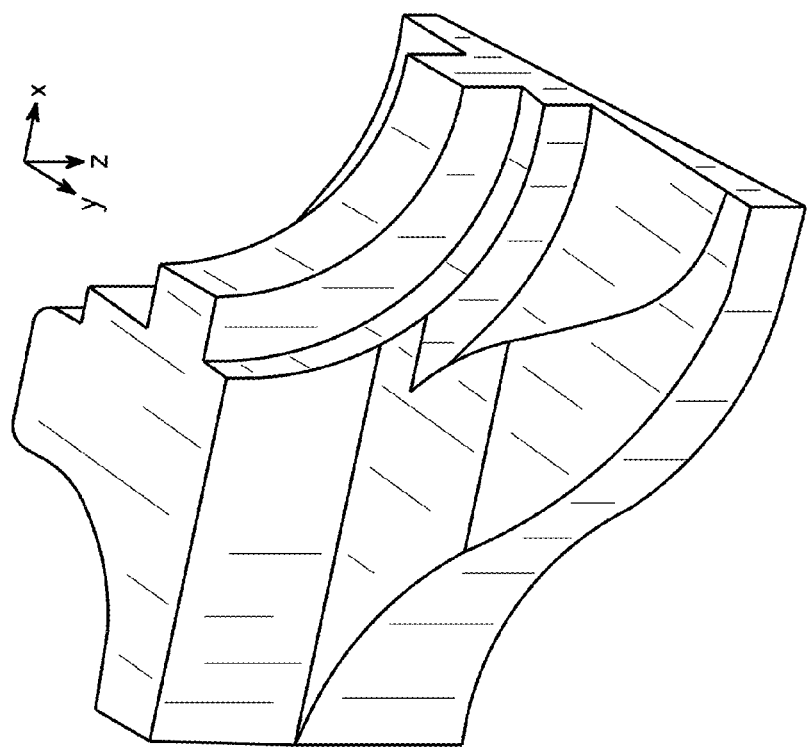

FIG. 6 depicts an example flow chart for quadrilateral mesh generation. At 602, a geometric structure representing a physical object is received as input, and the structure includes multiple regions (e.g., faces). The geometric structure corresponds to a computer-assisted-design (CAD) model (e.g., as shown in FIG. 7(A)). At 604, an edge meshing is performed for the structure (e.g., as shown in FIG. 7(B)). At 606, a triangle meshing is performed to generate an initial mesh (e.g., as shown in FIG. 8(A)).

At 608, one or more constraints related to a directional field (e.g., a cross field) are calculated. For example, constraints related to principal curvature directions and/or constraints related to local data of the geometric structure (e.g., boundaries, edges, features, and user-specified directions) are determined. Particularly, the constraints are related to interior boundaries (e.g. holes, cutouts, etc.), exterior boundaries (e.g., the outer edges of a surface, etc.), sharp features (e.g. crease edges, etc.), prominent features (e.g. features with high curvatures, smooth creases, etc.), and/or user-specified directions.

At 610, directional guidance (e.g., a directional field) is determined (e.g., as shown in FIG. 8(B)) based on the calculated constraints, such as the constraints related to principal curvature directions and/or the constraints related to local data of the geometric structure. The directional field may be determined at a body level, on a group of regions, or an individual region based on the constraints. If the directional field (e.g., a cross field) that is computed on a region is locally optimal, but not globally optimal, the directional field is recalculated locally in regions where there is a high degree of discontinuity. Singularities on the region are calculated and injected (e.g., to capture the curvatures). An advancing front method (e.g., Q-Morph, paving, etc.) is performed based on the directional guidance (e.g., the directional field) and the size field of the region.

At 612, quadrilateral meshes are generated (e.g., as shown in FIG. 9(A)) based on the directional guidance (e.g., the directional field), the size field, and the calculated constraints. The generated meshes follow the geometric contours, such as principal curvature directions and/or user defined directional constraints. For example, singularity isolines are traced into patches on the initial mesh, and the patches are further meshed with the constraints related to the directional field on patch boundaries or other boundaries. In some embodiments, any user-defined constraints may be implemented for generating quadrilateral meshes, including composite ply boundaries.

At 614, one or more quality-improvement processes are performed on the generated quadrilateral meshes. For example, a front smoothing process may be performed (e.g., to move one or more vertices around) to improve the shapes of the generated quadrilateral mesh elements based on a weighted combination of a size field and a directional field (e.g., a cross field) at a front location. At 616, final quadrilateral meshes are generated (e.g., as shown in FIG. 9(B)).

In some embodiments, one or more constraints are applied on curvature directions related to a region of the geometric structure. If the curvature directions are discontinuous, the applied constraints may be removed. In certain embodiments, one or more constraints are applied on boundaries related to a region of the geometric structure. Certain constraints on one or more layer-related parameters are removed to adjust one or more layers from boundaries.

Figure 10:
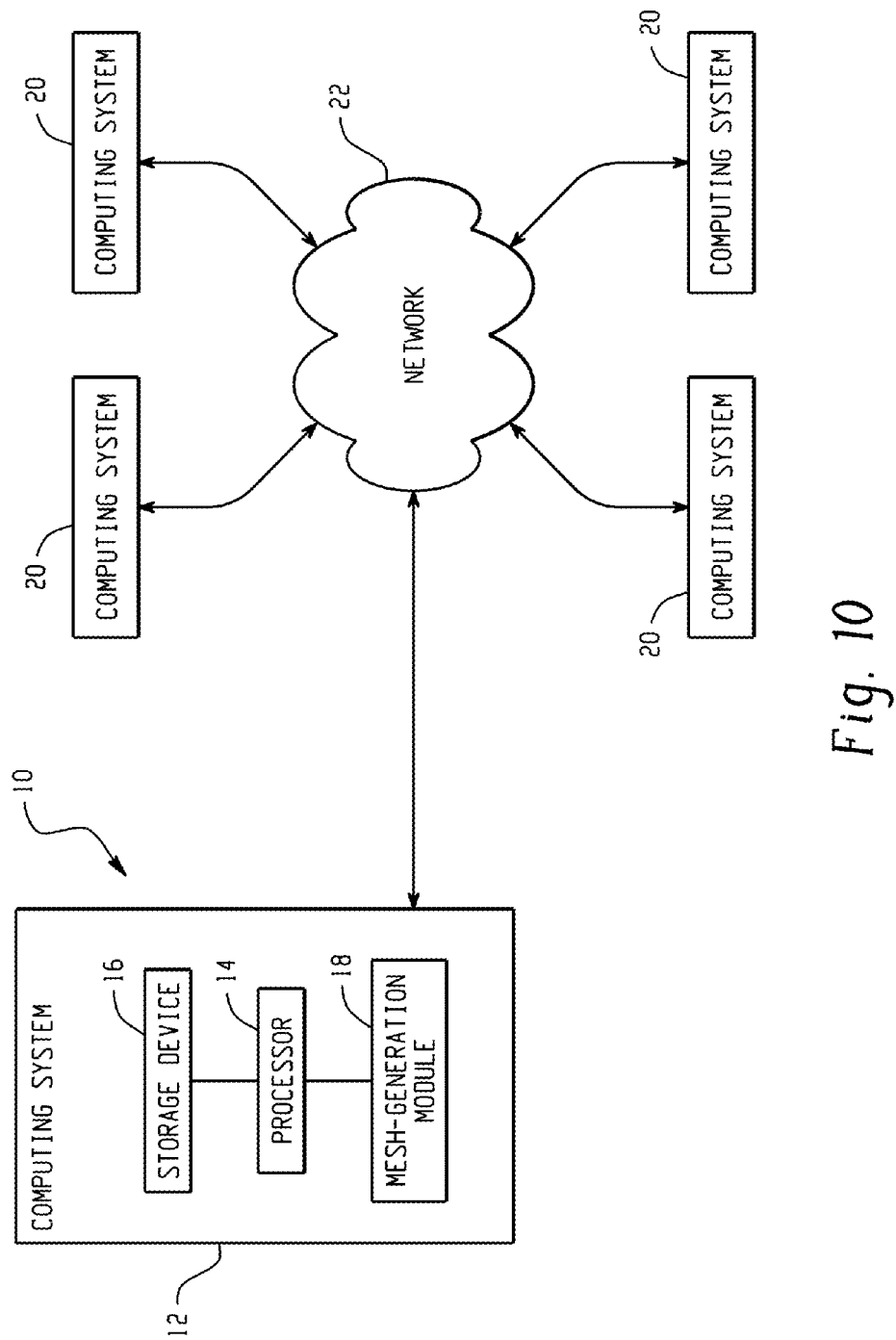
FIG. 10 depicts an example diagram showing a system for quadrilateral mesh generation.

FIG. 10 depicts an example diagram showing a system for quadrilateral mesh generation. As shown in FIG. 10, the system 10 includes a computing system 12 which contains a processor 14, a storage device 16 and a mesh-generation module 18. The computing system 12 includes any suitable type of computing device (e.g., a server, a desktop, a laptop, a tablet, a mobile phone, etc.) that includes the processor 14 or provide access to a processor via a network or as part of a cloud based application. The mesh-generation module 18 includes tasks and is implemented as part of a user interface module (not shown in FIG. 10).

Figure 11:
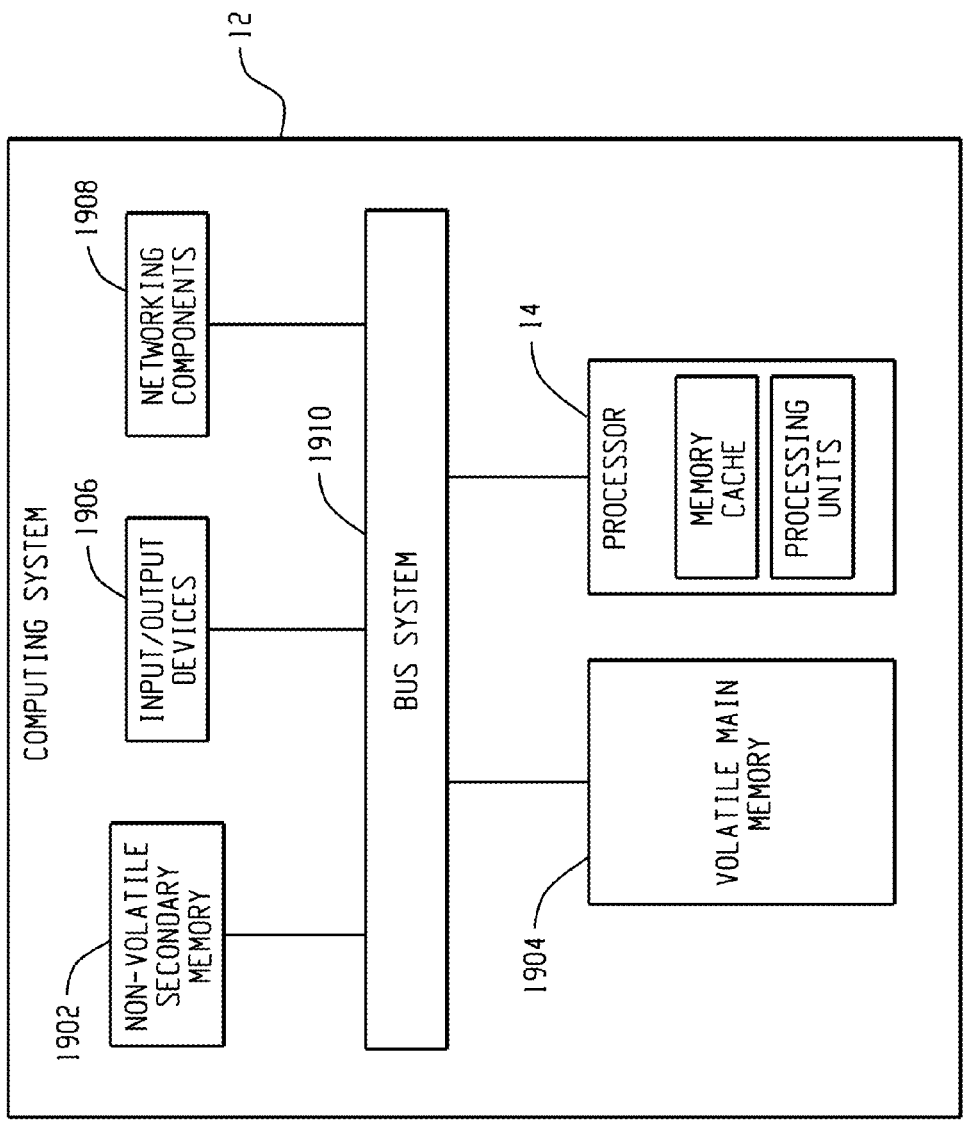
FIG. 11 depicts an example diagram showing a computing system for performing quadrilateral mesh generation.

FIG. 11 depicts an example diagram showing a computing system for performing quadrilateral mesh generation. As shown in FIG. 11, the computing system 12 includes a processor 14, memory devices 1902 and 1904, one or more input/output devices 1906, one or more networking components 1908, and a system bus 1910. In some embodiments, the computing system 12 includes the mesh-generation module 18, and provides access to the mesh-generation module 18 to a user as a stand-alone computer.

This written description uses examples to disclose the invention, including the best mode, and also to enable a person skilled in the art to make and use the invention. The patentable scope of the invention may include other examples.

For example, the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of non-transitory computer-readable storage medium that is stored at a single location or distributed across multiple locations. The medium can include computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example, as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A processor-implemented system for generating quadrilateral mesh elements to represent a physical object, the system comprising:
   one or more data processors configured to:
      receive a geometric structure representing a physical object;
      determine a directional field;
      determine a size field;
      select one or more locations associated with local data from a region of the geometric structure; and
      generate one or more quadrilateral mesh elements based at least in part on the directional field, the size field, and the local data to represent the physical object; and
   a non-transitory computer-readable storage medium configured to:
      store a first data structure for the geometric structure;
      store data related to the directional field, data related to the size field, and the local data; and
      store a second data structure for the one or more quadrilateral mesh elements;
   wherein the one or more data processors are further configured to update the second data structure based at least in part on the first data structure, the data related to the directional field, the data related to the size field and the local data;
   wherein the one or more locations correspond to non-singular locations; and
   wherein the one or more data processors are further configured to:
      generate the one or more quadrilateral mesh elements based on a weighted combination of the size field and the directional field;
      determine an angle weight based at least in part on an angle between the directional field and a front growth direction;
      determine a length weight based at least in part on a ratio between the size field and a front length; and
      generate the one or more quadrilateral mesh elements based at last in part on a linear combination of the angle weight and the length weight.

2. The system of claim 1, wherein the one or more data processors are further configured to generate the quadrilateral mesh elements using an advanced front approach.

3. The system of claim 2, wherein the one or more data processors are further configured to generate the quadrilateral mesh elements using a paving approach.

4. The system of claim 2, wherein the one or more data processors are further configured to generate the quadrilateral mesh elements using a Q-Morph approach.

5. The system of claim 1, wherein the local data includes one or more of the following: sizes of local fronts, interaction between local fronts, interactions between features, and front directions.

6. The system of claim 1, wherein the one or more data processors are further configured to generate the quadrilateral mesh elements using a weighted combination of the directional field, the size field, and the local data.

7. The system of claim 1, wherein the one or more data processors are further configured to select the front growth direction from two orthogonal directions.

8. The system of claim 7, wherein:
   the two orthogonal directions include a first direction and a second direction, where the first direction aligns better with an initial growth direction than the second direction; and
   the one or more data processors are further configured to select the first direction as the front growth direction.

9. The system of claim 7, wherein:
   the two orthogonal directions include a first direction and a second direction, where a first angle between the first direction and an initial growth direction and a second angle between the second direction and the initial growth direction are both larger than a threshold;
   the first direction aligns better with a growth direction of a neighboring front than the second direction; and
   the one or more data processors are further configured to select the first direction as the front growth direction.

10. The system of claim 1, wherein:
   the one or more locations include a singular location; and
   the one or more data processors are further configured to generate the one or more quadrilateral mesh elements for the singular location using a predetermined direction and a predetermined size associated with the singular location.

11. The system of claim 1, wherein:
   the one or more locations include a singular location; and
   the one or more data processors are further configured to generate the one or more quadrilateral mesh elements for the singular location in a predetermined pattern.

12. The system of claim 11, wherein the one or more data processors are further configured to:
   in response to the singular location corresponds to a negative singularity, generate three quadrilateral elements around the singular location; and
   in response to the singular location corresponds to a positive singularity, generate five quadrilateral elements around the singular location.

13. The system of claim 1, wherein:
the one or more data processors are further configured to:
  generate one or more initial meshes for the geometric structure;
  determine one or more first constraints related to one or more curvature directions of the geometric structure based at least in part on the one or more initial meshes;
  determine one or more second constraints related to the local data of the geometric structure based at least in part on the one or more initial meshes;
  determine the directional field based at least in part on the one or more first constraints and the one or more second constraints; and
  generate the one or more quadrilateral mesh elements based at least in part on the directional field, the size field, the one or more first constraints and the one or more second constraints; and
the non-transitory computer-readable storage medium is further configured to store data related to the one or more first constraints and data related to the one or more second constraints;
wherein the one or more data processors are further configured to update the second data structure based at least in part on the first data structure, the data related to the directional field, the data related to the size field, the data related to the one or more first constraints and the data related to the one or more second constraints.

14. The system of claim 13, wherein the one or more data processors are further configured to perform edge meshing and triangle meshing on one or more initial regions of the geometric structure to generate the one or more initial meshes.

15. The system of claim 13, wherein the one or more second constraints are related to one or more of the following: interior boundaries of the geometric structure, exterior boundaries of the geometric structure, sharp features of the geometric structure, prominent features of the geometric structure, and user-specified directions.

16. The system of claim 13, wherein the one or more data processors configured to determine the directional field at a body level, on a group of regions of the geometric structure, or on an individual region of the geometric structure.

17. A method for generating quadrilateral mesh elements to represent a physical object, the method comprising:
  receiving a geometric structure representing a physical object, a first data structure for the geometric structure being stored in a non-transitory computer-readable storage medium;
  determining a directional field using one or more data processors, data related to the directional field being stored in the non-transitory computer-readable storage medium;
  determining a size field using the one or more data processors, data related to the size field being stored in the non-transitory computer-readable storage medium;
  selecting one or more locations from a region of the geometric structure, local data associated with the locations being stored in the non-transitory computer-readable storage medium; and
  generating one or more quadrilateral mesh elements based at least in part on the directional field, the size field, and the local data using the one or more data processors, a second data structure for the one or more quadrilateral elements being stored in the non-transitory computer-readable storage medium;
  wherein the second data structure is updated based at least in part on the first data structure, the data related to the directional field, the data related to the size field and the local data;
  wherein the one or more locations correspond to non-singular locations; and
  wherein the method further includes:
    generating the one or more quadrilateral mesh elements based on a weighted combination of the size field and the directional field;
    determining an angle weight based at least in part on an angle between the directional field and a front growth direction;
    determining a length weight based at least in part on a ratio between the size field and a front length; and
    generating the one or more quadrilateral mesh elements based at last in part on a linear combination of the angle weight and the length weight.

18. A non-transitory machine-readable medium encoded with instructions for commanding one or more data processors to execute operations of a method for generating quadrilateral mesh elements to represent a physical object, the method comprising:
  receiving a geometric structure representing a physical object, a first data structure for the geometric structure being stored in a non-transitory computer-readable storage medium;
  determining a directional field using one or more data processors, data related to the directional field being stored in the non-transitory computer-readable storage medium;
  determining a size field using the one or more data processors, data related to the size field being stored being stored in the non-transitory computer-readable storage medium;
  selecting one or more locations from a region of the geometric structure, local data associated with the locations being stored in the non-transitory computer-readable storage medium; and
  generating one or more quadrilateral mesh elements based at least in part on the directional field, the size field, and the local data using the one or more data processors, a second data structure for the one or more quadrilateral elements being stored in the non-transitory computer-readable storage medium;
  wherein the second data structure is updated based at least in part on the first data structure, the data related to the directional field, the data related to the size field and the local data;
  wherein the one or more locations correspond to non-singular locations: and wherein the method further includes:
    generating the one or more quadrilateral mesh elements based on a weighted combination of the size field and the directional field;
    determining an angle weight based at least in part on an angle between the directional field and a front growth direction;
    determining a length weight based at least in part on a ratio between the size field and a front length: and
    generating the one or more quadrilateral mesh elements based at last in part on a linear combination of the angle weight and the length weight.

* * * * *